UNITED STATES PATENT OFFICE.

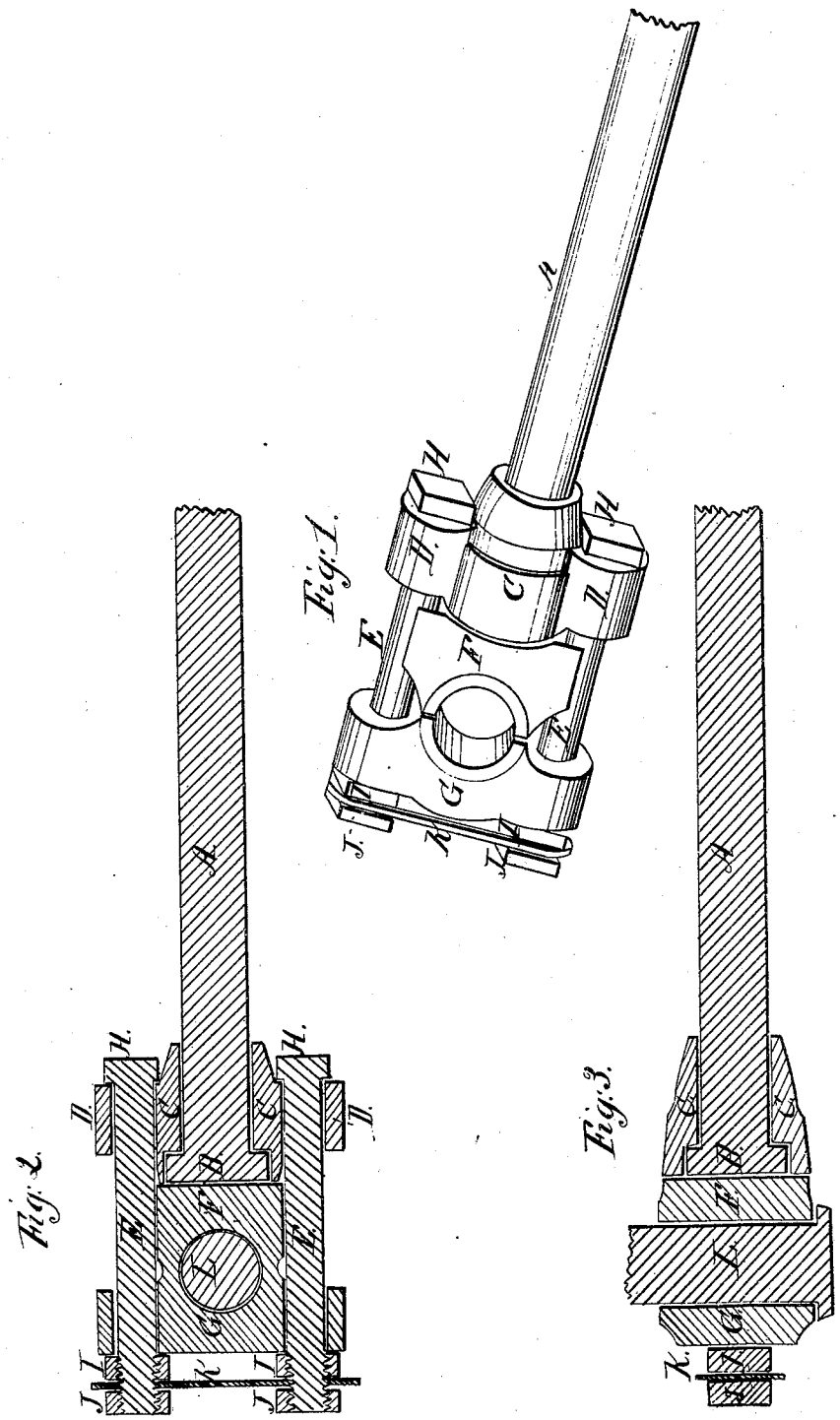

BUTLER J. HUNTER, OF LEDYARD, NEW YORK.

IMPROVEMENT IN HARVESTER-PITMEN.

Specification forming part of Letters Patent No. 57,140, dated August 14, 1866.

*To all whom it may concern:*

Be it known that I, BUTLER J. HUNTER, of the town of Ledyard, in the county of Cayuga and State of New York, have invented certain new and useful Improvements in Reaping and Mowing Machines; and I do hereby declare that the following is a full and exact description thereof, reference being had to the accompanying drawings, and to the letters of reference marked thereon, in which—

Figure 1 is a perspective view of my improved pitman. Fig. 2 is a view of a longitudinal section through the center of Fig. 1, so drawn as to show a cross-section of the crank-pin or wrist-pin L. Fig. 3 is a view of a longitudinal section of Fig. 1, drawn at right angles to that of Fig. 2.

The same letters when they occur in the drawings indicate like parts.

The nature of the invention consists in an improved method of connecting the pitman to the crank-pin or wrist, so as to give it the requisite freedom, and at the same time admit of a perfect adjustment of the boxes which connect the pitman to the crank-pin or wrist, and is an improvement on the invention patented by C. Wheeler, Jr., February 9, 1864.

To enable others skilled in the art to make and use my invention, I will proceed to describe its construction and operation.

A is the pitman-rod, constructed of round iron or steel, and has formed on it a head, B. The other end, which is broken off, may be constructed either with a hook or an eye, for connecting it with the knife-head, and will be determined in its length by the form of construction of the other parts of the machine.

C is the swivel-piece, constructed of iron or other metal, having ear-pieces D on either side for the reception of the bolts E, holes being made in the ears D for the purpose. The swivel-piece C has a hole through its center corresponding to the diameter of the pitman A under its head D. The swivel-piece C has the hole through its center enlarged, so as to correspond to the form of the head B of the pitman. The hole in the swivel-piece C and the pitman A and its head B are so constructed that the pitman, when inserted in the swivel-piece, will turn in it freely and smoothly.

F and G are boxes of brass or composition, the box F having grooves at each side, so that the bolts E, when inserted in the swivel-piece, will support it. The box G has ears on each side, through which the bolts E pass. The bolts E have screw-threads at one end and heads H at the other. The bolts E have double nuts I and J, and between them is placed plate K.

The pitman-rod A is inserted in the swivel-piece C, the bolts E and boxes F and G being placed in their position on the wrist or crank pin L. The nuts I are screwed snugly down to the ears of the box G and the plate K placed on the bolts, which has holes in each end for that purpose, corresponding with distance the bolts are apart. The nuts J are then screwed snugly down to the plate K, which prevents all tendency to work loose.

The chamber or enlargement of the hole in the swivel-piece C for the reception of the head B of the pitman-rod A is made a little deeper than the thickness of the head B, so that the box F, when brought snugly down by the screws and nuts on the bolts E, will bear on the swivel-piece C, instead of on the head B of the pitman A.

By this arrangement the boxes can be brought together so as to remain firmly and securely in their position on the wrist, and the pitman at the same time remain free to turn in the swivel-piece without binding, thereby preventing the tendency to rapid wear and displacement of the several parts, and remedying the difficulty met with heretofore in inexperienced operators screwing the boxes firmly against the pitman-head, so as to prevent its turning in the swivel-piece, thereby causing the breakage of the knife-head or pitman. The same results may be obtained by constructing the box F with a chamber or recess for the head of the pitman, but not in as good a degree.

This arrangement of parts, as heretofore described, is cheap in construction and easily repaired.

Having fully described the invention, what is claimed as the invention of the said BUTLER J. HUNTER is—

1. The swivel-piece C, constructed with a chamber or recess for the reception of the pitman-head B, substantially as and for the purposes set forth.

2. The combination of the swivel-piece, having a recess, with the boxes F and G and bolts E, substantially as described.

BUTLER J. HUNTER.

Witnesses:
JOHN R. WETSELL,
JAMES ANTHONY.